United States Patent [19]

George

[11] 4,361,056
[45] Nov. 30, 1982

[54] APPARATUS FOR PRODUCING COMPOUND AXIAL AND ROTARY MOVEMENT OF A SHAFT

[75] Inventor: Robert D. George, Dayton, Ohio

[73] Assignee: Mechaneer, Inc., Dayton, Ohio

[21] Appl. No.: 256,799

[22] Filed: Apr. 23, 1980

[51] Int. Cl.³ .................. F16H 37/16; B65H 81/06
[52] U.S. Cl. ............................. 74/25; 74/23; 74/52; 242/1.1 R
[58] Field of Search .................. 74/23, 52, 25; 242/1.1 R, 1.1 A, 1.1 E

[56] References Cited

U.S. PATENT DOCUMENTS

| | | | |
|---|---|---|---|
| 1,220,883 | 3/1917 | Parker | 74/52 |
| 1,253,023 | 1/1918 | George | 74/23 |
| 2,624,904 | 1/1953 | Wianco | 74/23 |
| 2,632,602 | 3/1953 | Weis | 242/1.1 R |
| 2,847,170 | 8/1958 | Lill et al. | 242/1.1 R |
| 2,949,789 | 8/1960 | Eminger | 74/23 |
| 3,179,346 | 4/1965 | Weis | 242/1.1 R |
| 3,251,559 | 5/1966 | Moore | 242/1.1 R |
| 3,276,275 | 10/1966 | Ebbert | 74/23 |
| 3,460,770 | 8/1969 | Eminger | 242/1.1 R |
| 3,493,186 | 2/1970 | Arick | 242/1.1 R |
| 3,750,969 | 8/1973 | Weis | 74/23 |
| 3,768,319 | 10/1973 | Lill | 242/1.1 R |
| 3,785,212 | 1/1974 | Eminger | 242/1.1 R |
| 4,158,314 | 6/1979 | Finegold | 74/23 |

Primary Examiner—Lawrence J. Staab
Attorney, Agent, or Firm—Jacox & Meckstroth

[57] ABSTRACT

A housing supports a hollow shaft for both axial and rotary movement and also supports a drive input rotor for rotation on an axis perpendicular to the axis of the hollow shaft. The rotor carries an eccentrically located planetary gear which engages a surrounding stationary ring gear, and the planetary gear carries an eccentric crank shaft. A crank arm connects the crank shaft to a rotary coupling mounted on the hollow shaft, and an intermediate portion of the crank arm carries a rack which engages gear teeth on the hollow shaft. The rotor is provided with means for counter-balancing the moving components to provide for high speed winding of wire coils within a motor stator.

13 Claims, 2 Drawing Figures

APPARATUS FOR PRODUCING COMPOUND AXIAL AND ROTARY MOVEMENT OF A SHAFT

BACKGROUND OF THE INVENTION

In the design of a machine or apparatus for winding wire into coils within a motor stator, commonly a pair of wires are directed through an elongated hollow shaft which is supported for both axial or reciprocating movement and for rotary or oscillating movement. The compound or simultaneous reciprocating and oscillating movement of the shaft in order to wind the wires into corresponding coils within the stator have been performed or proposed by various types of mechanisms, for example, as disclosed in the following U.S. patents:

| U.S. Pat. No. | Patentee | Issue Date |
| --- | --- | --- |
| 2,847,170 | J. F. Lill et al | Aug. 12, 1958 |
| 2,949,789 | R. J. Eminger | Aug. 23, 1960 |
| 3,179,346 | W. B. Weis | April 20, 1965 |
| 3,251,559 | H. W. Moore | May 17, 1966 |
| 3,276,275 | R. J. Ebbert | Oct. 4, 1966 |
| 3,460,770 | R. J. Eminger | Aug. 12, 1969 |
| 3,493,186 | R. E. Arick | Feb. 3, 1970 |
| 3,768,319 | J. F. Lill | Oct. 30, 1973 |
| 3,785,212 | R. J. Eminger | Jan. 15, 1974 |
| 4,158,314 | H. B. Finegold | June 19, 1979 |

In the design of a stator coil winding apparatus such as disclosed in the above patents, it is desirable for the apparatus to be simple and economical in construction and dependable in operation. It is also desirable for the apparatus to be capable of operating at a relatively high speed and require a minimum of down time for maintenance for successively winding a series of stator coils with maximum efficiency and speed.

SUMMARY OF THE INVENTION

The present invention is directed to an improved apparatus for producing compound or simultaneous oscillating and reciprocating movement of an elongated shaft and which is particularly adapted for efficiently winding wire coils within an electric motor stator, but which may also have other applications. In general, the apparatus of the invention provides all of the desirable features mentioned above, and in particular, is simple and economical in construction and may be operated at a relatively high speed with a minimum of maintenance.

In accordance with one embodiment of the invention, the above features and advantages are provided by apparatus which includes a housing through which extends a tubular or hollow wire guide shaft supported for both rotary and axial movement. The housing also supports a rotor for rotation on an axis which is perpendicular to the axis of the hollow shaft. The rotor functions as a fly wheel and also supports an offset eccentric shaft which carries a planetary gear in mesh with a surrounding stationary ring gear. The planetary gear carries an offset eccentric crank shaft which receives one end portion of a crank arm. The opposite end portion of the crank arm is pivotably connected to a rotary coupling mounted on the hollow guide shaft.

An intermediate portion of the crank arm supports a rotary cross shaft which carries a rack in engagement with gear teeth formed on the hollow shaft. The particular arrangement of the components provides for reciprocating the wire guide shaft with a predetermined stroke and for simultaneously oscillating the wire guide shaft through a predetermined angle and in precise timed relation with the reciprocating movement of the shaft.

Other features and advantages of the invention will be apparent from the following description, the accompanying drawing and the appended claims.

DESCRIPTION OF THE PREFERRED EMBODIMENT

Figure 1:
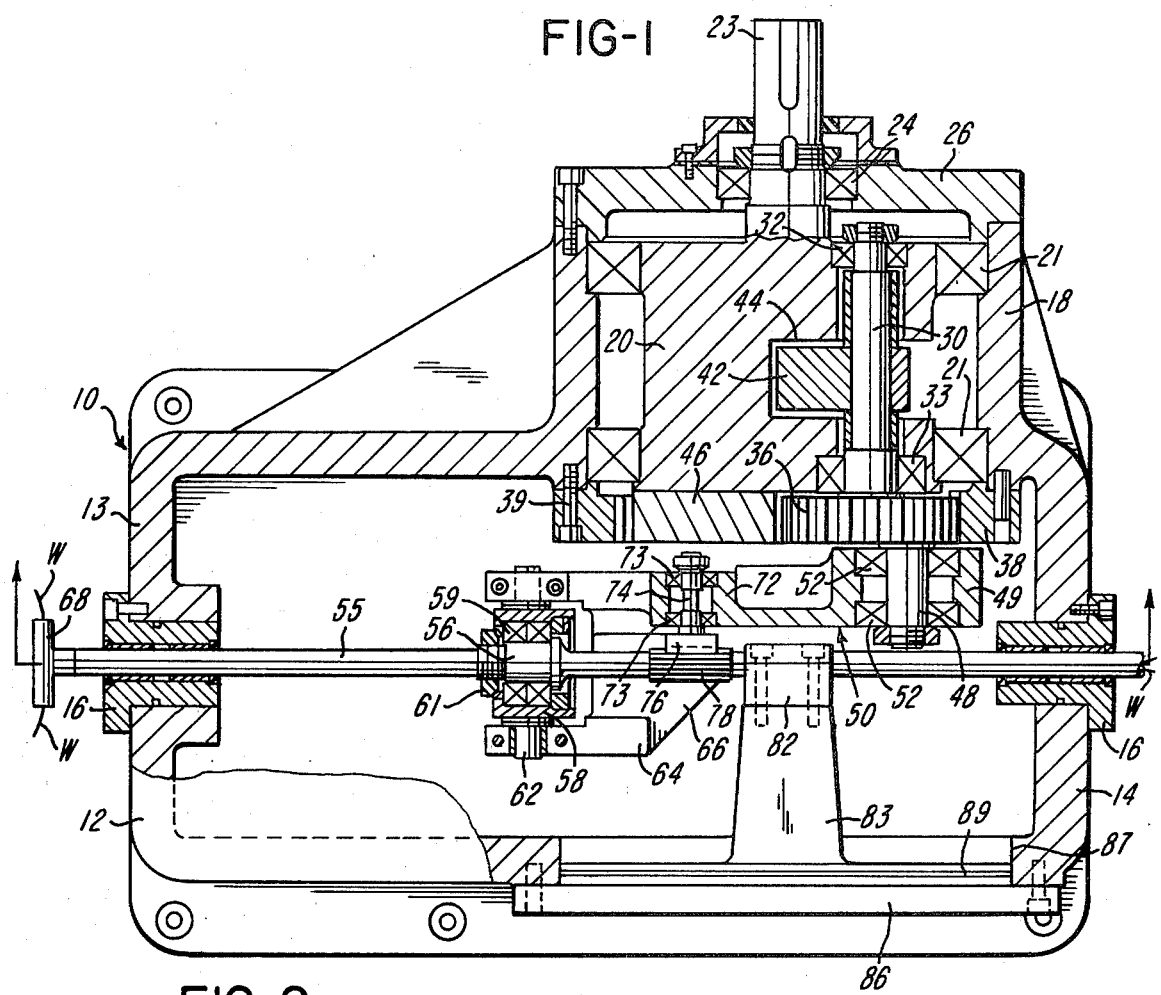
FIG. 1 is a horizontal section through stator coil winding apparatus constructed in accordance with the invention.
Figure 2:
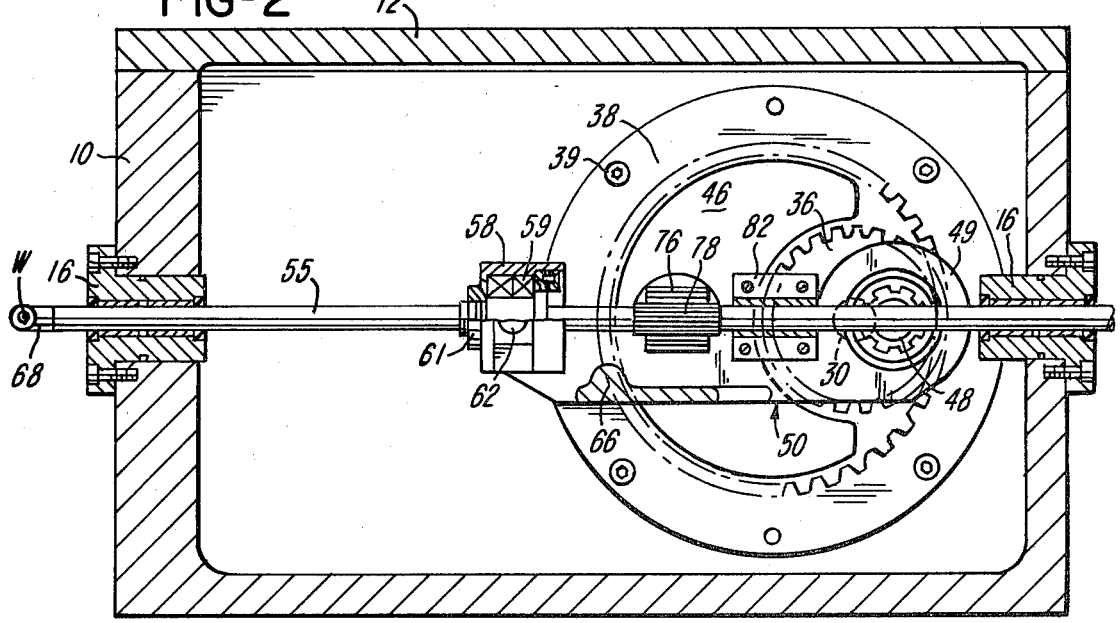
FIG. 2 is a vertical section of the apparatus taken generally on the line 2—2 of FIG. 1.

The stator winding apparatus shown in FIGS. 1 and 2, includes a cast metal housing 10 having a removable top cover plate 12 and opposite end walls 13 and 14 which support a set of axially aligned bearings 16. The housing 10 also includes a laterally projecting portion 18 which encloses a rotor 20 supported by a set of anti-friction bearings 21. The rotor 20 includes an outwardly projecting input shaft 23 which is supported by an anti-friction bearing 24 retained within an end plate secured to the housing portion 18. The shaft 23 is adapted to be driven by a variable speed electric motor drive (not shown) through a suitable belt drive or direct drive connection.

A shaft 30 is supported or carried by the rotor 20 with its axis eccentric and parallel to the axis of the rotor 20. The shaft 30 is rotatably supported by a set of anti-friction bearings 32 and 33 and carries a planetary gear 36 which engages or meshes with a ring gear 38 secured to the housing portion 18 by peripherally spaced screws 39. The shaft 30 also carries an eccentrically positioned cylindrical counterweight 42 which rotates with the shaft 30 within a recess 44 formed within the rotor 20. Another crescent-shaped weight member 46 is secured to the inner surface of the rotor 20 and partially surrounds the planetary gear 36, as shown in FIG. 2. A stub crank shaft 48 projects from the planetary gear 36 with an axis eccentric and parallel to the axis of the shaft 30 and supports one end portion 49 of a crank arm 50. The crank shaft 48 projects through a pair of anti-friction bearings 52 which are confined within the end portion 49 of the crank arm 50.

An elongated tubular wire guide shaft 55 is supported for both axial and rotary movement by the bearings 16, and an enlarged intermediate portion 56 of the shaft 55 carries a collar 58 which is rotatably supported by a set of anti-friction bearings 59 retained on the shaft portion 56 by a lock nut 61. A pair of diametrically opposed trunions 62 project outwardly from the collar 58 and pivotably support parallel spaced ears 64 forming a U-shaped end portion 66 for the crank arm 50. The collar 58, bearings 59 and trunions 62 provide for relative rotation between the shaft 55 and the end portion 66 of the crank arm 50 and also produce axial movement of the shaft 55 in response to movement of the crank arm 50. The hollow wire guide shaft 55 is adapted to receive a pair of wires W which extend through the shaft and then through a T-shaped wire guide fitting 68 mounted on the forward of the shaft 55. In a manner as disclosed in some of the above listed patents, the pair of wires W are used for winding a corresponding pair of wire coils within a motor stator in response to reciprocating and oscillating movement of the shaft 55 and the fitting 68 within the center bore of the preassembled stator laminations.

The crank arm 50 includes an intermediate portion 72 which forms part of the U-shaped portion 66, and the portion 72 retains a set of anti-friction bearings 73 which support a cross shaft 74. A linear gear or rack 76 is mounted on an end of the shaft 74 and engages or meshes with gear teeth 78 formed on the shaft 55. An intermediate portion of the shaft 55 is supported for rotary and axial movement by a bearing block 82 which surrounds the shaft 55. The block 82 is secured to a hub portion 83 projecting inwardly as part of a plug-type closure plate 86 which mounts within a cylindrical opening 87 formed within a side wall of the housing 10. An O-ring 89 forms a fluid-tight seal between the closure plate 86 and the housing 10.

In operation of the winding machine or apparatus for winding coils within a motor stator, the housing receives a supply of lubricating oil, and the shaft 55 receives a pair of wires W. The input shaft 23 is driven preferably by a variable speed electric motor drive, as mentioned above. When the rotor 20 rotates within the bearings 21, the eccentrically located planetary gear 36 orbits in a circular path within the ring gear 38. As a result of the eccentric location of the crankshaft 48, the crankshaft 48 and the end portion 49 of the crank arm 50 move in an oval-shaped path, for example, generally similar to the path illustrated in FIG. 2 of above mentioned U.S. Pat. No. 3,785,212. As the crank arm portion 49 moves along this path of the crankshaft 48, the crank arm 50 is effective to reciprocate the shaft 55 as a result of the connection of the crank arm 50 to the crankshaft 55 through the collar and bearings 59.

The oscillating movement of the orbiting crank arm 50 causes the rack 76 to oscillate the shaft 55 primarily along the end portions of the oval path of the crankshaft 50. This combined oscillation and reciprocation of the shaft 55 is effective to wind the wires W into corresponding coils within the motor stator laminations. As mentioned above, the eccentrically located cylindrical disc or weight member 42 on the shaft 30 and the crescent-shaped weight member 46 on the rotor 20 provide for balancing the rotation of the rotor 20, shaft 30 and the gear 36 as well as the movements of the crank arm 50 and shaft 55.

From the drawing and the above description, it is apparent that a machine or apparatus constructed in accordance with the invention, provides desirable features and advantages. As one important feature, the apparatus is relatively simple and economical in construction in comparison to other types of stator winding machines such as disclosed in the above listed patents and thus is more economical to produce. In addition, the simplified and balanced construction of the apparatus enables it to be operated at a relatively high speed so that the stator coil winding operation may be performed more efficiently. The construction of the apparatus also provides for dependable operation so that down time of the apparatus for servicing, is minimized.

While the form of apparatus herein described constitutes a preferred embodiment of the invention, it is to be understood that the invention is not limited to this precise form of apparatus, and that changes may be made therein without departing from the scope and spirit of the invention as defined in the appended claims.

The invention having thus been described, the following is claimed:

1. Apparatus for producing compound axial and rotary movement of a shaft and adapted for winding wire coils within a motor stator, comprising an elongated shaft, means supporting said shaft for both axial and rotary movement, a crank arm, pivot means connecting said shaft to a first portion of said arm and providing for rotation of said shaft relative to said arm and pivotal movement of said arm relative to said shaft, rotary drive means adapted to be driven by a motor, means connecting said rotary drive means to a second portion of said arm and providing for orbital movement of said second portion of said arm along a predetermined orbital path, said crank arm and said pivot means being effective to reciprocate said shaft axially in response to movement of said second portion of said arm along said orbital path, and gear means connecting said shaft to a third portion of said arm and being effective to oscillate said shaft in response to movement of said second portion of said arm along said orbital path to provide for simultaneous reciprocating and oscillating movement of said shaft in response to rotation of said rotary drive means.

2. Apparatus for producing compound axial and rotary movement of a shaft and adapted for winding wire coils within a motor stator, comprising an elongated shaft, a housing including means supporting said shaft for both axial and rotary movement, a crank arm, pivot means connecting said shaft to a first portion of said arm and providing for rotation of said shaft relative to said arm and pivotal movement of said arm relative to said shaft, a rotor enclosed within said housing and adapted to be driven by a motor, eccentric shaft means connecting said rotor to a second portion of said arm, means for orbiting said shaft means and said second portion of said arm along a predetermined orbital path in response to rotation of said rotor, said crank arm and said pivot means being effective to reciprocate said shaft axially in response to movement of said second portion of said arm along said orbital path, and gear means connecting said shaft to a third portion of said arm intermediate said first and second portions and being effective to oscillate said shaft in response to movement of said second portion of said arm along said orbital path to provide for simultaneous reciprocating and oscillating movement of said shaft in response to rotation of said rotor.

3. Apparatus for producing compound axial and rotary movement of a shaft and adapted for winding wire coils within a motor stator, comprising an elongated shaft, means supporting said shaft for both axial and rotary movement, a crank arm, pivot means connecting said shaft to a first portion of said arm and providing for rotation of said shaft relative to said arm and pivotal movement of said arm relative to said shaft, rotary drive means adapted to be driven by a motor, said rotary drive means including an eccentric planetary gear supported for rotation with a ring gear, eccentric shaft means connecting a second portion of said arm to said planetary gear and providing for orbital movement of said second portion of said arm along a predetermined generally oval-shaped orbital path, said crank arm and said pivot means being effective to reciprocate said shaft axially in response to movement of said second portion of said arm along said orbital path, a gear rack on a third portion of said arm and engaging gear teeth on said shaft to produce oscillation of said shaft in response to movement of said second portion of said arm along said orbital path to provide for simultaneous reciprocating and oscillating movement of said shaft in response to rotation of said rotary drive means.

4. Apparatus for producing compound axial and rotary movement of a shaft and adapted for winding wire coils within a motor stator, comprising a housing, an elongated shaft extending through said housing, means on said housing and supporting said shaft for both axial and rotary movement, a crank arm within said housing, pivot means connecting said shaft to a first portion of said crank arm and providing for rotation of said shaft relative to said arm and pivotal movement of said arm relative to said shaft, a rotor supported within said housing and adapted to be driven by a motor, said rotor including a planetary gear supported for rotation on an axis eccentric to the axis of said rotor, said planetary gear meshing with a surrounding stationary ring gear, eccentric shaft means connecting said planetary gear to a second portion of said arm and providing for orbital movement of said second portion of said arm along a predetermined generally oval-shaped orbital path, said crank arm and said pivot means being effective to reciprocate said shaft axially in response to movement of said second portion of said arm along said orbital path, and a gear rack connected to a third portion of said arm between said first and second portions and engaging gear teeth on said shaft to produce oscillation of said shaft in response to movement of said second portion of said arm along said orbital path to provide for simultaneous reciprocating and oscillating movement of said shaft in response to rotation of said rotor.

5. Apparatus as defined in claim 2 or 4 and including means associated with said rotor for counterbalancing said eccentric shaft means and said crank arm to provide for high speed operation of said apparatus.

6. Apparatus as defined in 1 or 4 and including bearing means supported within said housing and supporting an intermediate portion of said elongated shaft for said compound movement.

7. Apparatus as defined in claim 1 or 4 wherein the axis of said rotor is perpendicular to the axis of said elongated shaft.

8. Apparatus as defined in claim 4 wherein said rotor includes an eccentric shaft having an axis in parallel spaced relation to the axis of said rotor, and said eccentric shaft supports said planetary gear for rotation within said ring gear.

9. Apparatus as defined in claim 8 and including a weight member eccentrically mounted on said eccentric shaft to provide for balancing the moving components of said apparatus.

10. Apparatus as defined in claim 4 wherein said rotor includes a crescent-shaped portion partially surrounding said planetary gear to provide for balancing the moving components of said apparatus.

11. Apparatus as defined in claim 4 wherein said gear rack is disposed on said crank arm closer to said pivot means than said eccentric shaft means.

12. Apparatus as described in claim 1 or 4 wherein said pivot means comprise a collar surrounding said elongated shaft, bearing means mounted on said shaft and supporting said collar for rotation, a pair of diametrically opposed trunions projecting outwardly from said collar, and said crank arm includes parallel spaced portions receiving said trunions and providing for pivotal movement of said crank arm on the axis of said trunions.

13. Apparatus as defined in claim 4 wherein said elongated shaft is hollow for receiving wires to wind stator coils.

* * * * *